July 1, 1941.  W. V. STEWART  2,247,414
AUTOMATIC THERMOSTATIC SWITCH
Filed Aug. 23, 1939
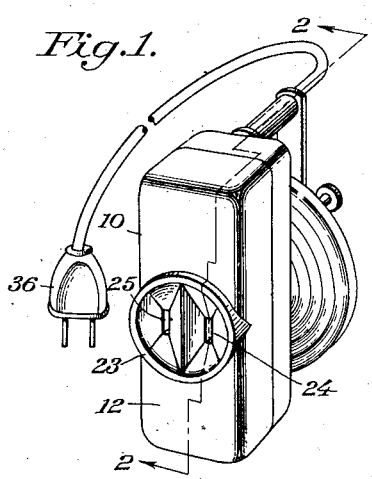
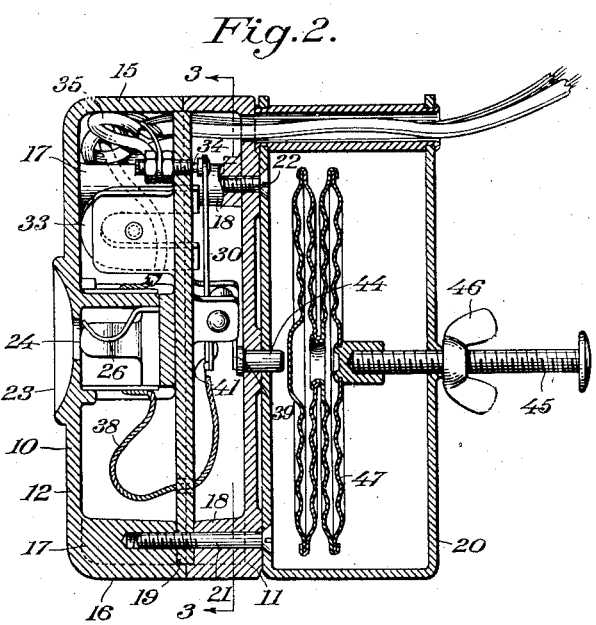
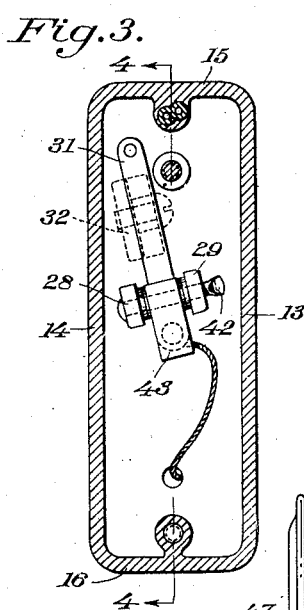
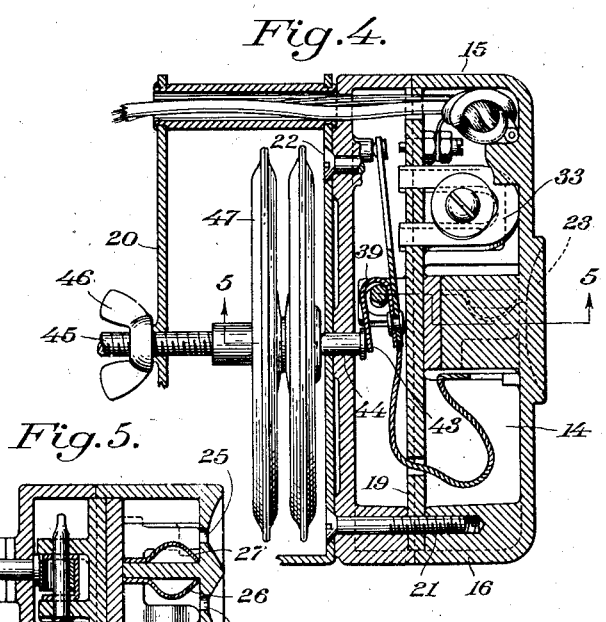
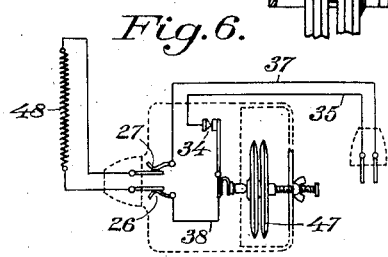
William V. Stewart,
INVENTOR
BY Victor J. Evans & Co.
ATTORNEYS Patented July 1, 1941

2,247,414

UNITED STATES PATENT OFFICE 2,247,414

AUTOMATIC THERMOSTATIC SWITCH

William V. Stewart, Quincy, Ill.

Application August 23, 1939, Serial No. 291,582

3 Claims. (Cl. 200—140)

My invention relates to new and useful improvements in automatic switches.

An important object of my invention is to provide an automatic switch that is adapted to thermostatically control the temperature of a room, brooder house, or the like.

Another object of my invention is the provision of an automatic switch having means incorporated therewith to cause the action of the switch to be substantially instantaneous in its opening or closing movement.

Still another object of my invention is the provision of a switch of the above-mentioned character that may be easily and expeditiously set to cause an electric circuit to be opened or closed at a preselected temperature.

Yet another object of my invention is to provide a switch that is adjustable to permit the temperature at which the electric circuit may be opened or closed to be selectively varied, but that will accurately maintain the enclosure at the preselected temperature once the device is set and installed for operation.

A further object of my invention is the provision of the automatic switch that may be easily installed and that is efficient and efficacious in the performance of its duties.

A yet further object of my invention is to provide a switch that is simple in construction and inexpensive to manufacture.

Other objects and advantages of my invention will be apparent during the course of the following description.

In the drawing, forming a part of this specification, and in which like numerals are formed to designate like parts throughout the same, Figure 1 is a perspective view of a device embodying my invention, Figure 2 is a longitudinal sectional view, taken on the line 2—2 of Figure 1, Figure 3 is a transverse sectional view, taken on the line 3—3 of Figure 2, Figure 4 is a longitudinal sectional view, taken on the line 4—4 of Figure 3, Figure 5 is a fragmentary transverse sectional view, taken on the line 5—5 of Figure 4, and Figure 6 is a schematic diagram illustrating pertinent parts of the invention.

In the accompanying drawing, wherein for the purpose of illustration, is shown a preferred embodiment of my invention, the numeral 10 designates an elongated casing of substantially rectangular formation in plan having a bottom 11 and a top 12, side walls 13 and 14, and end walls 15 and 16. The casing is slit transversely adjacent the bottom 11 and the sections defined thereby are formed with bosses 17 and 18 adapted to accommodate the transverse partition 19 therebetween. A substantially rectangular frame 20 is mounted longitudinally of the bottom 11 and the threaded screws 21 and 22 extend through aligning openings in the frame, bosses 17 and 18 and partition 19 to hold the same assembled in a compact unit. The top 12 of the casing is formed centrally thereof with a conventional female receptacle 23, having spaced slots 24 and 25 which afford communication with the contacts 26 and 27, respectively.

The casing and partition may be made of any suitable insulated material, and one side of the partition 19 is formed substantially centrally thereof with spaced vertically projecting supports 28 and 29 between which is pivoted an essentially rigid contact arm 30. The opposite side of the partition is formed intermediate the pivot of the lever arm and the end 31 thereof with a support 32 to which is attached a U-shaped permanent magnet 33 the ends of which project through the partition and terminate adjacent the underside of the contact arm 30 to hold the end 31 of the arm normally engaged with the contact 34.

The spring clip 39 is provided with tabs having openings which receive the pivot pin 42 in a manner to position the arm portions of the clip in embracing relation with the pin. The arm 40 of the clip is riveted, or otherwise secured, to the end 41 of the contact arm and the arm 43 thereof is positioned substantially centrally of the bottom 11 of the casing. An insulated pin 44 is slidably mounted in aligning openings in the bottom 11 and frame 20, with the inner end thereof engaging the arm 43 of the spring clip, and with the outer end terminating a substantial distance within the frame 20. An adjusting screw 45 is threadedly carried by the frame 20 in axial alignment with the pin 44 and a wing nut 46 is carried thereby exteriorly of the frame to provide a locking means when threaded into engagement with the frame, as clearly illustrated in Figure 2. A thermostatic wafer 47 is mounted on the inner end of the adjusting screw 45 and in contactual relation with the outwardly extending end of the pin 44.

A conductor 35 connects the contact 34 with a male plug 36 which is adapted to be inserted in any 110 volt outlet. The conductor 37 connects the plug 36 to the contact 27, and a conductor 38 connects the contact 26 with the contact arm 30.

The operation of my device is as follows:

The device may be mounted in any suitable enclosure such as a brooding house, or the like, and is adapted to operate to maintain a constant temperature within the enclosure. The male plug 36 may be inserted in any 110 volt outlet to energize the electric circuit within the casing 10, and a suitable resistance 48 may be plugged into the female receptacle 23, as illustrated in Figure 6. The thermostatic wafer 47 is filled with any suitable fluid having sufficient volatility to cause the sections comprising the same to expand with an increase in the temperature and to correspondingly contract with a drop in temperature.

The magnet 33 will normally attract the contact arm 30 to hold the same in engagement with the contact 34 and to close the circuit to the resistance or heating element 48. When the heating element has raised the temperature of the enclosure to the temperature for which the device is set, the wafer 47 will have expanded sufficiently to engage the pin 44 and to slidably actuate the same to flex the resilient arm 43 of the spring clip. The resilient action of the spring clip will permit considerable flexing movement of the arm 43 but as soon as a critical point is reached sufficient to overcome the magnetic attraction of the magnet 33 the contact arm will snap away from the magnet and disengage the contact 34 to break the circuit at that point. The sudden snap of the contact arm 30 away from the contact 34 will prevent arcing therebetween, thus eliminating the contingency of the possible disintegration of the contact arm or of the contact by the continual arcing effected by a slow separation thereof.

Inasmuch as the heating element 48 has been rendered inoperative by the expansion of the wafer 47, the temperature in the room will begin to drop and the sections of the wafer 47 will consequently contract. As soon as the sections have contracted sufficiently to permit the magnetic attraction of the magnet 33 to overcome the resilient action of the spring clip, the contact arm will once more engage the contact to close the circuit and to energize the heater 48. It may be seen that the closing action of the contact arm will be rapidly accomplished to effect a snap action in the same manner as the resilient action of the spring clip is used to snap the same to the open position, and that the possibility of arcing between the contact and the contact arm has been reduced to a minimum.

It is obvious that the wafer 47 may be adjustably positioned at varying distances from the pin 44 to permit the device to operate at any reasonable preselected temperature, but that once the device is operatively adjusted, the temperature will be accurately controlled by the expansion and contraction of the wafer 47.

It is to be understood that the form of my invention, herewith shown and described, is to be taken as a preferred example of the same, and that various changes in the size, shape and arrangement of parts may be resorted to without departing from the spirit of my invention, or the scope of the appended claims.

Having thus described my invention, I claim:

1. A switch comprising a support, a fixed contact carried by the support, a permanent magnet fixedly secured to said support in close proximity to the contact, a rigid contact arm pivoted intermediate its ends to the support and with one end normally attracted by said magnet to engage the fixed contact, a spring clip carried by the end of the contact arm remote from the fixed contact, a pin slidably carried by the support and engaging the said spring clip, a thermostatic wafer mounted on the support in a manner to engage the pin and to slidably actuate the same to flex the said spring clip to a critical point sufficient to overcome the magnetic attraction of the magnet and to snap the contact arm substantially instantaneously away from the said magnet, and an adjustable means associated with the wafer to space the same a requisite distance from the said pin.

2. In a switch, a support, a fixed contact carried by the support, a clip pivotally mounted on the support, said clip having spaced spring arms extending from the pivot in a direction away from the fixed contact, a rigid contact arm having one end secured to one of the spring arms and the other end arranged for movement into and out of engagement with the fixed contact, a permanent magnet mounted on the support intermediate the fixed contact and the said clip and normally acting on the contact arm to hold the same in engagement with the fixed contact, and an actuating means engageable with the other of the spring arms, said means being responsive to temperature changes to flex the spring arm thus engaged to a critical point sufficient to overcome the magnetic attraction of the magnet, whereby the clip will pivot about its axis and snap the contact arm substantially instantaneously away from the said magnet and the fixed contact.

3. A switch comprising a support, a fixed contact carried by the support, a permanent magnet fixedly secured to the support in close proximity to the contact, a rigid contact arm pivoted intermediate its ends to the support and with one end normally attracted by the magnet to engage the fixed contact, a spring clip carried by the end of the contact arm remote from the fixed contact, a pin slidably carried by the support and engaging the said spring clip, and a thermostatic wafer mounted on the support in a manner to engage the pin and to slidably actuate the same to flex the said spring clip to a critical point sufficient to overcome the attraction of the magnet and to snap the contact arm substantially instantaneously away from the said magnet.

WILLIAM V. STEWART.